(12) United States Patent
Burgner

(10) Patent No.: US 7,046,448 B2
(45) Date of Patent: May 16, 2006

(54) VEHICLE INFORMATION DISPLAY

(75) Inventor: Lori L Burgner, Fenton, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 11/039,901

(22) Filed: Jan. 21, 2005

(65) Prior Publication Data

US 2005/0134966 A1   Jun. 23, 2005

Related U.S. Application Data

(63) Continuation of application No. 10/225,851, filed on Aug. 22, 2002, now Pat. No. 6,847,487.

(60) Provisional application No. 60/314,457, filed on Aug. 23, 2001.

(51) Int. Cl.
*G02B 27/14* (2006.01)
*G09G 5/00* (2006.01)
*B60Q 1/00* (2006.01)

(52) U.S. Cl. .............. 359/630; 359/633; 359/839; 345/7; 362/492

(58) Field of Classification Search ........ 359/629–631, 359/633, 362, 802, 839, 843; 345/7–9; 348/148, 348/151; 362/492, 494, 545; 250/214 AL; 318/568.1; 235/380
See application file for complete search history.

(56) References Cited

U.S. PATENT DOCUMENTS

| | | | |
|---|---|---|---|
| 4,882,565 A | 11/1989 | Gallmeyer | 340/461 |
| 5,416,313 A | 5/1995 | Larson et al. | 250/214 |
| 5,530,240 A | 6/1996 | Larson et al. | |
| 5,550,677 A | 8/1996 | Schofield et al. | 359/604 |
| 5,619,370 A | 4/1997 | Guinosso | |
| 5,634,709 A | 6/1997 | Iwama | |
| 5,670,935 A | 9/1997 | Schofield et al. | 340/461 |
| 5,724,187 A | 3/1998 | Varaprasad et al. | 359/608 |
| 5,760,962 A | 6/1998 | Schofield et al. | 359/604 |
| 5,786,772 A | 7/1998 | Schofield et al. | 340/903 |
| 5,798,575 A | 8/1998 | O'Farrell et al. | 307/10.1 |
| 5,877,897 A | 3/1999 | Schofield et al. | 359/604 |
| 5,914,815 A | 6/1999 | Bos | 359/571 |
| 5,929,786 A | 7/1999 | Schofield et al. | 340/903 |
| 5,940,120 A | 8/1999 | Frankhouse et al. | 348/61 |
| 5,949,331 A | 9/1999 | Schofield et al. | 340/461 |
| 5,956,181 A | 9/1999 | Lin | |
| 5,959,367 A | 9/1999 | O'Farrell et al. | 307/10.1 |
| 5,990,649 A | 11/1999 | Nagao et al. | |
| 6,087,953 A | 7/2000 | DeLine et al. | 340/815.4 |
| 6,124,647 A | 9/2000 | Marcus et al. | 307/10.1 |
| 6,139,172 A | 10/2000 | Bos et al. | 362/494 |
| 6,172,613 B1 | 1/2001 | DeLine et al. | 340/815.4 |
| 6,175,164 B1 | 1/2001 | O'Farrell et al. | 307/10.1 |

(Continued)

*Primary Examiner*—Loha Ben
*Assistant Examiner*—Jack Dinh
(74) *Attorney, Agent, or Firm*—Van Dyke, Gardner, Linn & Burkhart, LLP

(57) ABSTRACT

A rearview mirror display system for a vehicle including a rearview mirror assembly, a reflective element and a projection display. The rearview mirror assembly comprises a mirror casing. The reflective element is included at the casing and has a front and a back. The front is directed toward and viewable by a driver of the vehicle when the assembly is mounted in the vehicle. The projection display is positioned in the casing to the rear of the back of the reflective element. The reflective element comprises a transflective reflective element. An image projected by the projection display is viewable by a driver of the vehicle from the front of the transflective reflective element.

18 Claims, 2 Drawing Sheets

U.S. PATENT DOCUMENTS

| | | | |
|---|---|---|---|
| 6,175,300 B1 | 1/2001 | Kendrick | 340/436 |
| 6,198,409 B1 | 3/2001 | Schofield et al. | 340/903 |
| 6,201,642 B1 | 3/2001 | Bos | 359/565 |
| 6,222,447 B1 | 4/2001 | Schofield et al. | 340/461 |
| 6,222,460 B1 | 4/2001 | DeLine et al. | 340/815.4 |
| 6,291,906 B1 | 9/2001 | Marcus et al. | 307/10.1 |
| 6,294,989 B1 | 9/2001 | Schofield et al. | 340/442 |
| 6,326,613 B1 | 12/2001 | Heslin et al. | 250/239 |
| 6,329,925 B1 | 12/2001 | Skiver et al. | 340/815.4 |
| 6,333,759 B1 | 12/2001 | Mazzilli | 348/148 |
| 6,370,329 B1 | 4/2002 | Teuchert | 396/7 |
| 6,420,975 B1 | 7/2002 | DeLine et al. | 340/815.4 |
| 6,428,172 B1 | 8/2002 | Hutzel et al. | 359/838 |
| 6,547,133 B1 | 4/2003 | DeVries et al. | |
| 2002/0003571 A1 | 1/2002 | Schofield et al. | 348/148 |
| 2002/0005999 A1 | 1/2002 | Hutzel et al. | 359/838 |
| 2002/0044065 A1 | 4/2002 | Quist et al. | 340/815.4 |

VEHICLE INFORMATION DISPLAY

CROSS REFERENCE TO RELATED APPLICATION

The present application is a continuation of U.S. patent application, Ser. No. 10/225,851, filed Aug. 22, 2002 by Burnner for VEHICLE INFORMATION DISPLAY, now U.S. Pat. No. 6,847,487, which claims priority of U.S. provisional application, Ser. No. 60/314,457, filed Aug. 23, 2001 by Burgner for VEHICLE INFORMATION DISPLAY, which are hereby incorporated herein by reference in their entireties.

FIELD OF THE INVENTION

This invention relates to providing an improved apparatus and method for displaying information to a driver of a vehicle and, more particularly, to an apparatus and method for displaying information at an interior rearview mirror of the vehicle.

BACKGROUND OF THE INVENTION

Display of information to a driver by incorporation of information displays in or at an interior mirror assembly is known, as disclosed in commonly assigned U.S. Pat. No. 6,124,647 (INFORMATION DISPLAY IN A REARVIEW MIRROR), which is hereby incorporated herein by reference.

Such known mirror-located information displays work well for their intended purposes, but challenges can exist in packaging the display element, and particularly when it is a video display screen, within the often crowded interior of an interior rearview mirror assembly of the vehicle. Also, incorporation or the like of a 1.5 inch diagonal liquid crystal video display screen, or the equivalent, sometimes requires removal of a portion of the reflective coating of the mirror reflector element of the mirror assembly, thus potentially effecting its rearward field of view.

Therefore, there is a need for an improved vehicular information display, and particularly a mirror-mounted video display, that is readily accommodated within the interior rearview mirror assembly, and that provides a video display of a size readily readable and viewable by a driver or other vehicular occupant, and that does not unnecessarily detract from the rear vision performance of the mirror reflective element in the interior mirror assembly.

SUMMARY OF THE INVENTION

The present invention is intended to provide a display for an interior rearview mirror assembly which is operable to project a display at a mirror reflective element for viewing by a driver of the vehicle. The display element may be positioned remotely from the mirror reflective element and may be positioned in a plane which is separate and remote from the plane of the mirror reflective element. More particularly, the present invention comprises a micro-display system which projects a reverse image on a semitransparent screen affixed to a transreflective element, preferably included in an interior rearview mirror assembly of the vehicle. Thus, when viewed from the front, the image displayed in the rearview mirror is readable by the driver. Preferably, the invention comprises a backlit transmissive type micro-display which displays information obtained from an image capture device (such as a CMOS video camera).

According to an aspect of the present invention, an interior rearview mirror assembly for a vehicle comprises a casing, a reflective element and a display. The reflective element has a back surface and a front surface, with the front surface being directed toward and being viewable by a driver of the vehicle. The display comprises a micro-display element which is positioned within the casing and which is operable to project light onto a screen portion of the reflective element. The projected light is viewable as an image on the reflective element by the driver of the vehicle.

Preferably, the image viewable on the reflective element is a reverse image of the projected light from the micro-display element. Preferably, the back surface of the reflective element comprises the screen portion. Preferably, the screen portion comprises a semi-transparent screen portion. Preferably, the micro-display element comprises a transmissive micro-display element. Preferably, the display comprises a light source which is operable to back light the transmissive micro-display element.

Optionally, the display may be operable to display information received from a rearview vision system of the vehicle, wherein the rearview vision system is operable to capture an image of a scene rearwardly of the vehicle. Preferably, the display is operable to display the information in response to the vehicle being shifted into reverse.

Preferably, the micro-display element is mounted on a printed circuit board within the casing. The printed circuit board may include circuitry associated with at least one accessory of the interior rearview mirror assembly. Preferably, the micro-display element is aligned to project the projected light generally parallel to the reflective element, whereby the display includes a reflective optic for reflecting the projected light toward the reflective element.

The display may include at least one optic along an optical path between the micro-display element and the reflective element. The optic may comprise a reflective optic for reflecting the light toward the reflective element. The optic may comprise at least one of a transmissive optic, a diffractive optic and a refractive optic positioned between the reflective optic and the screen portion of or at the reflective element. The display may also include at least one magnifying optic which functions to magnify the projected light.

The reflective element may comprise a prismatic reflective element or an electro-optic reflective element. The electro-optic reflective element may comprise first and second substrates, wherein the back surface of the reflective element comprises a back surface of the second substrate (commonly referred to in the art as the fourth surface of the reflective element) while the front surface of the reflective element comprises a front surface of the first substrate (commonly referred to in the art as the first surface of the reflective element). The image is projected through the second substrate and onto the first substrate for viewing by the driver of the vehicle.

According to another aspect of the present invention, an interior rearview mirror assembly for a vehicle comprises a casing, a reflective element, and a display. The reflective element has a back surface and a front surface, with the front surface directed toward and viewable by a driver of the vehicle. The display comprises a display element positioned within the casing and operable to project light onto a screen portion of the reflective element. The light is viewable as an image on the reflective element by the driver of the vehicle. The display element is positioned in a first plane and the reflective element is positioned in a second plane, wherein the first plane is angled with respect to the second plane.

Preferably, the first plane is generally orthogonal to the second plane. The display comprises a reflective optic which functions to redirect the projected light toward the reflective element. Preferably, the display element comprises a micro-display element. Preferably, the display includes a magnifying refractive optic or diffractive optic positioned between the reflective optic and the reflective element of the mirror assembly.

According to another aspect of the present invention, an interior rearview mirror assembly for a vehicle comprises a casing, a reflective element and a display. The reflective element has a back surface and a front surface, with the front surface being directed toward and viewable by a driver of the vehicle. The display comprises a micro-display element positioned within the casing and operable to project light onto a screen portion of the reflective element. The projected light is viewable as an image on the reflective element by a driver of the vehicle. The micro-display element is aligned to project the projected light in a direction generally along the reflective element. The display comprises at least one reflective optic for reflecting the projected light toward the reflective element. The image on the reflective element is a reverse image of the light projected by the micro-display element.

Therefore, the present invention provides a display for an interior rearview mirror assembly of a vehicle. The display is operable to project light or an image onto a screen portion or display portion of a reflective element of the interior rearview mirror assembly. The display includes a micro-display element which may be positioned separate and remote from the reflective element to enhance packaging of the display within the casing of the mirror assembly. The display may be operable to project light or an image in a direction generally along the reflective element. The display then includes a reflector for directing the projected light or image toward and onto the display portion of the mirror reflective element. The display element may be mounted to a printed circuit board within the casing of the interior rearview mirror assembly. The display of the present invention thus is readily accommodated within an interior rearview mirror assembly and thus may be easier to package within the mirror assembly.

These and other objects, advantages, purposes, and features of the present invention will become more apparent from the study of the following description taken in conjunction with the drawings.

DESCRIPTION OF THE PREFERRED EMBODIMENTS

Figure 1:
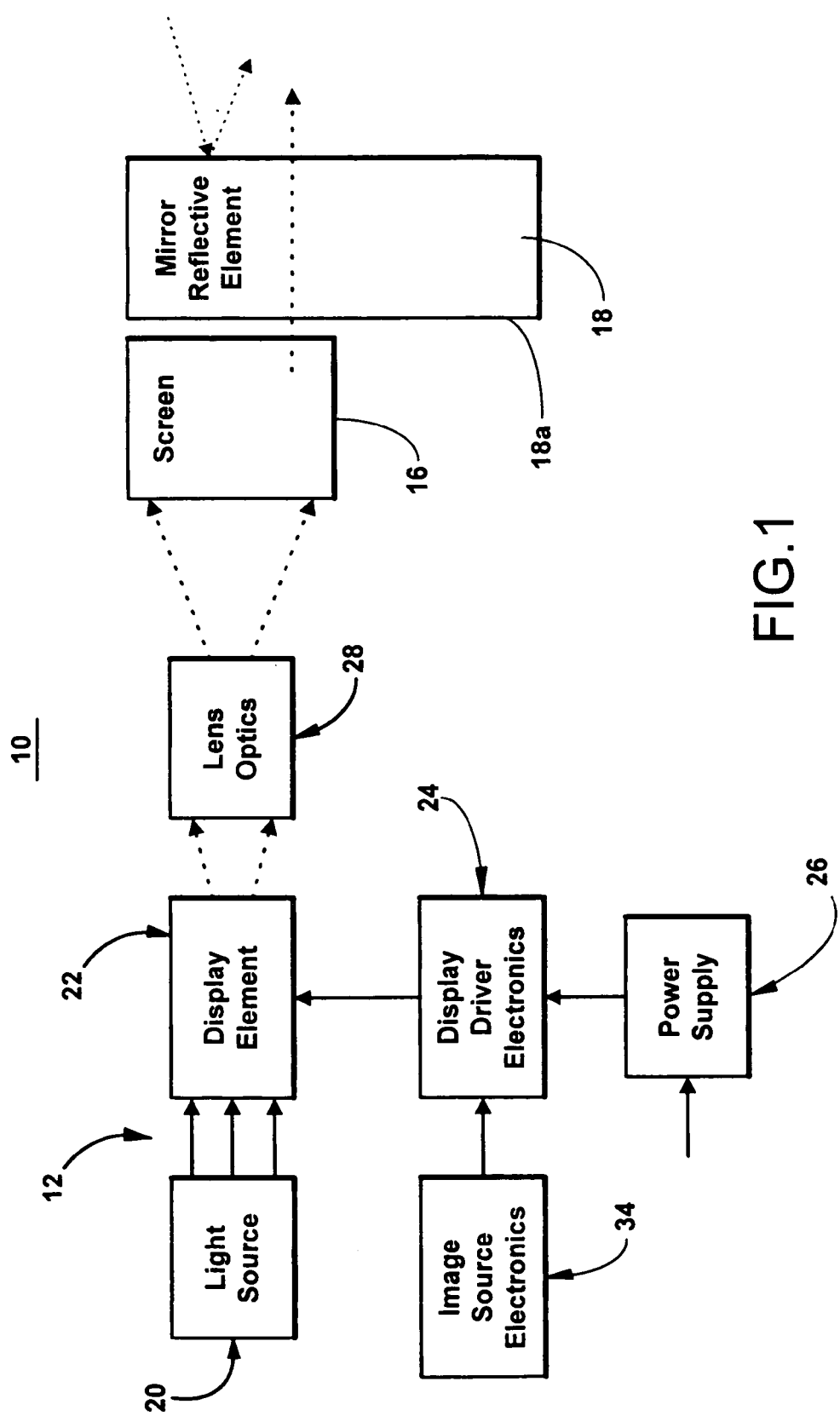
FIG. 1 is a block diagram of an information display in accordance with the present invention.
Figure 2:
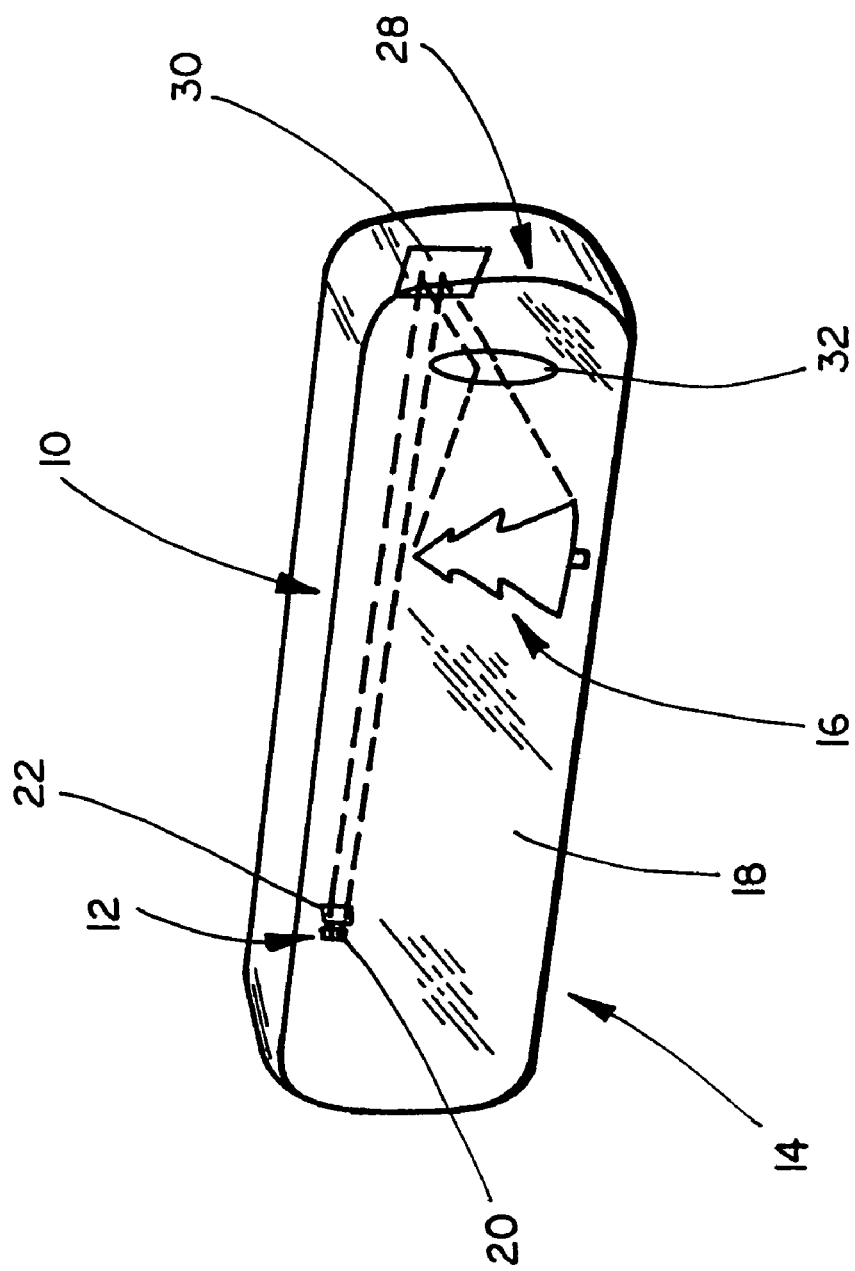
FIG. 2 is a perspective view of an interior rearview mirror assembly incorporating an information display in accordance with the present invention.

Referring now to the drawings and the illustrative embodiments depicted therein, an information display system 10 includes a micro-display 12 mounted at, and preferably within, an interior rearview mirror assembly 14 of a vehicle (FIGS. 1 and 2). More particularly, the display system of the present invention includes a transmissive micro-display 12 that projects a reverse-image on a semi-transparent screen 16 at a reflective element 18 of the mirror assembly 14. The driver of the vehicle views the semi-transparent screen 16 from the side opposite to the side from which the micro-display 12 displays its reverse image. The driver thus sees the normal (not the reverse-image) of the information being displayed, and this normal image is thus readily readable and understandable to the driver.

A variety of information can be displayed via the micro-display display system of the present invention, including alphanumerical information, graphical information, iconistic information, video images and/or the like. Such information and images may also or otherwise be displayed via the micro-display display system of the present invention in the information display systems and accessories of the vehicle, such as disclosed in commonly assigned U.S. Pat. No. 6,124,647 (INFORMATION DISPLAY IN A REARVIEW MIRROR); U.S. Pat. No. 6,222,460 (INTERIOR REARVIEW MIRROR SYSTEM INCORPORATING A SUPPLEMENTAL INFLATABLE RESTRAINT SYSTEM STATUS INFORMATION DISPLAY); U.S. Pat. No. 6,087,953 (REARVIEW MIRROR SUPPORT INCORPORATING VEHICLE INFORMATION DISPLAY); and U.S. Pat. No. 5,530,240 (DISPLAY FOR AUTOMATIC REARVIEW MIRROR); and commonly assigned U.S. pat. applications, Ser. No. 09/793,002, filed Feb. 26, 2001 by Schofield et al., entitled VIDEO MIRROR SYSTEMS INCORPORATING AN ACCESSORY MODULE, now U.S. Pat. No. 6,690,268; Ser. No. 09/244,726, filed Feb. 5, 1999 by DeLine et al., entitled REARVIEW MIRROR ASSEMBLY INCORPORATING VEHICLE INFORMATION DISPLAY, now U.S. Pat. No. 6,172,613; Ser. No. 09/660,712, filed Sept. 13, 2000 by Marcus et al., entitled INFORMATION DISPLAY FOR VEHICLES, now U.S. Pat. No. 6,291,906; Ser. No. 09/433,467, filed Nov. 4, 1999 by Heslin et al., entitled VEHICLE INTERIOR REARVIEW MIRROR ASSEMBLY ADAPTED FOR CONTAiNiNG A RAIN SENSOR, now U.S. Pat. No. 6,326,613; Ser. No. 09/663,036, filed Sep. 15, 2000 by Mousseau, entitled VEHICLE INTERIOR REARVIEW MIRROR ASSEMBLY WITH DISPLAY, now U.S. Pat. No. 6,520,667; Ser. No. 09/699,780, filed Oct. 30, 2000 by Mousseau et al., entitled VEHICLE INTERIOR REARVIEW MIRROR ASSEMBLY WITH DISPLAY; Ser. No. 09/899,474, filed Jul. 5, 2001 by Hutzel et al., entitled REARVIEW MIRROR ASSEMBLY WITH INFORMATION DISPLAY, now U.S. Pat. No. 6,648,477; Ser. No. 09/777,800, filed Feb. 6, 2001 by DeLine et al., entitled INTERIOR REARVIEW MIRROR SYSTEM INCORPORATING A LIGHT-EMITTING INFORMATION DISPLAY, now U.S. Pat. No. 6,326,900; and Ser. No. 09/817,874, filed Mar. 26, 2001, entitled INTERACTIVE AUTOMOTIVE REARVISION SYSTEM, which are all hereby incorporated herein by reference in their entireties.

The micro-display 12 of the present invention preferably includes a display emitting or transmitting device or light source 20 (preferably a non-incandescent light source, such as a light emitting diode and, most preferably, a white light emitting light emitting diode, such as disclosed in commonly assigned U.S. pat. application, Ser. No. 09/793,002, filed Feb. 26, 2001 by Schofield et al., entitled VIDEO MIRROR SYSTEMS INCORPORATING AN ACCESSORY MODULE, now U.S. Pat. No. 6,690,268; and U.S. Pat. Nos. 6,139,172 and 6,152,190, the entire disclosures of which are hereby incorporated by reference herein) that back-lights a transmissive micro-display element 22.

The micro-display element 22 comprises a compact assembly that preferably includes an active display area of preferably less than about 0.5 inches on diagonal, more preferably less than about 0.25 inches on diagonal, and most preferably less than about 0.1 inch on diagonal. Power consumption by the micro-display element is preferably less than about 500 milliwatts, more preferably less than about 150 milliwatts, and most preferably less than about 80 milliwatts. The micro-display element 22 is driven or controlled by a display driver control or electronics 24, which is connected to a power source 26, such as the vehicle battery or the like.

The micro-display element 22 preferably includes a multi-pixel array of individually addressable display pixels (typically each controlled by a pixel controller such as a thin film transistor) and, preferably, comprises a liquid crystal display medium (although other display media such as electroluminescent, light emitting diode, and/or field-emission can optionally be used, without affecting the scope of the present invention). A micro-display element suitable for use in the micro-display of the present invention is obtainable from Kopin Corp. of Taunton, Mass. under the trade name Cyber-Display Monochromatic 320. This is a monochromatic display element. The display element preferably comprises a single crystal silicon coupled with a materials technology that enables the transfer of on-screen and off-screen electronics from a silicon-on-insulator (SOI) wafer onto a glass substrate. Optionally, and preferably, color sequential technology (wherein time division multiplexing produces color by placing a repetitive sequence of red, green and blue sub images to the human eye) is used for the display of colored information. Alternatively, for display of colored information, the micro-display element may include a RGB, or equivalent, color mask. A suitable micro-display color display for use in an interior rearview mirror of the present invention is Kopin's CyberDisplay 320 Color that comprises a high performance, high resolution, low cost, transmissive Active Matrix Liquid Crystal Display (AMLCD) utilizing on-screen and off-screen electronics transferred from a silicon-on-insulator (SOI) wafer onto glass. The CyberDisplay 320 display thus includes a CMOS circuit transferred onto a glass substrate, enabling a transmissive AMLCD. The wafers are processed in a standard CMOS foundry. The fast single-crystalline silicon TFT so formed enables high-speed display application. The CyberDisplay 320 display design features circuitry integrated onto the actual display chip which simplifies interface requirements, and as described above, uses color sequential technology instead of the spatial color rendering technology which is the most common approach for current active matrix displays. In color sequential technology, the time division multiplexing produces color by placing a repetitive sequence of red, green and blue sub images to the human eye at very high speed and the eye then integrates the pictures into a beautiful color image. The result is a high-density full 24 bit, 16.7 million color display without the overhead inherent in other approaches.

The light beam that passes through the micro-display element is preferably directed, focused and/or magnified by at least one optical element or optic 28, such as by folded projection optics 30 (as commonly known in the projector optic art) and/or refractive, diffractive, transmissive and/or magnifying optics 32, onto a semi-transparent screen 16 (such as a screen having a transmissive beaded film structure, or a light diffusing surface/property or a light scattering property or the like). Optionally, and preferably, the rear surface 18a of the interior mirror reflective element 18 (i.e., the surface of the interior mirror reflective element closest to the vehicle windshield when the interior mirror assembly is mounted within the cabin of the vehicle) comprises a screen 16 and/or forms the screen onto which the micro-display element projects its image (FIG. 1). Importantly, the image being projected from the micro-display element (and as displayed on the side of the screen/interior mirror reflective element that the beam passing through the micro-display element impinges on) is the reverse image of the information desired to be conveyed to the driver or other vehicular occupant. However, when viewed from the front (i.e., the opposite side) of the screen/interior mirror reflective element by the driver, the driver sees the correct, non-reverse image.

In the illustrated embodiment of FIG. 2, the micro-display element 22 is positioned rearward or behind the reflective element 18 at an area remote from the display area 16. The illumination source 20 and micro-display element 22 occupies or is positioned generally in or along one plane, while the reflective element 18 (or rear surface 18a of the reflective element 18) occupies or is positioned generally in or along another plane. As can be seen in FIG. 2, the plane of the micro-display element 22 is positioned generally orthogonal to the plane of the reflective element 18, such that the image or display information or light projected from the micro-display 12 is projected generally along the rear surface 18a of the reflective element 18. The display system 10 of FIG. 2 thus includes the folded optic 30 to redirect the projected image toward the reflective element 18. The display system may also include a magnifying optic 32 positioned between the folded optic 30 and the screen portion 16 to enlarge the projected and redirected image to a viewable size on the screen portion 16.

The display system 10 may receive information or an image from an image source system 34, such as a rearview vision system or imaging system and/or side view and/or other blind spot imaging systems and/or the like (such as imaging systems of the types disclosed in commonly assigned U.S. Pat. Nos. 5,670,935 and 6,201,642 and U.S. pat. applications, Ser. No. 09/199,907, filed Nov. 25, 1998 by Bos et al. for WIDE ANGLE IMAGE CAPTURING SYSTEM FOR VEHICLE, now U.S. Pat. No. 6,717,610; and Ser. No. 10/010,862, filed Dec. 6, 2001 by Bos for PLASTIC LENS SYSTEM FOR VEHICLE IMAGING SYSTEM, now U.S. Pat. No. 6,757,109; and Ser. No. 09/767,939, filed Jan. 23, 2001 by Bos for WIDE ANGLE IMAGING SYSTEM, now U.S. Pat. No. 6,590,719, which are all hereby incorporated herein by reference). The display system 10 is operable to project the information or image received from the image source system or electronics 34 onto the display portion 16 for viewing by the driver of the vehicle.

An example application for the micro-display system of the present invention is as part of a vehicular blind/spot elimination system. The problems associated with rear blind spots when operating a vehicle in reverse are well known. Many accidents resulting in personal injury and property damage are related to a driver's inadequate view of the rear scene. This problem is of growing concern, especially now with the increasing popularity of larger vehicles such as SUVs and the like, which may have even larger rear blind spots than smaller vehicles such as sedans and the like.

Technical aids for backing-up, such as those based on ultrasound, which detect objects and alert drivers when obstacles are present to rear, have been introduced into the market in recent years. Such systems, however, typically convey information to the driver via visual or audio warning signals such as flashing lights or beeping sounds. One problem with such warning signals is that they may be susceptible to nuisance alarms, and it is possible that a driver may start to ignore warning signals if the occurrence of nuisance alarms becomes to frequent. Another problem with such systems is that they do not give the driver any information about what is being detected; they just alert the driver that something is being detected. Hence, the only prudent action for the driver to take is to stop, get out of the vehicle, and go see what is causing the alarm. Thus, there is a need for a system that assists drivers in safely backing-up which is not prone to nuisance alarms, and which allows the driver to "see" the scene to the rear of the vehicle.

One embodiment of the present invention involves displaying an image of a vehicle's rear scene, front scene and/or side lane scene(s) to the driver at or in the vehicle's interior rearview mirror assembly. Further, the invention involves projecting an image obtained from an image capture device (such as a CMOS camera) onto the back of a transreflective element (i.e., a mirror reflective element, and preferably an electrochromic reflective element, that is significantly reflective to light impinging from one side and that is substantially transmissive to light impinging from the opposite side, such as disclosed in U.S. Pat. No. 5,724,187, issued Mar. 3, 1998 to Varaprasad et al., entitled ELECTROCHROMIC MIRRORS AND DEVICES; and U.S. Pat. No. 5,668,663, issued Sep. 16, 1997 to Varaprasad et al., entitled ELECTROCHROMIC MIRRORS AND DEVICES, the disclosures of which are hereby incorporated herein by reference) which serves as the mirror reflective element in the rearview mirror assembly. The image is projected in reverse onto the rear of the transreflective element (relative to the seating position of the driver in the vehicle, and with the interior mirror assembly mounted in front of the driver) so that it is readable from the front by the driver.

The information obtained by the image capture device is sent to a micro-display positioned inside the housing (that houses the mirror reflective element) of the rearview mirror assembly. Using folded projection optics, the micro-display image may be projected onto the back of the transreflective element. Thus, for example, the micro-display may be mounted as a board/component element on a printed circuit board (PCB) within the mirror housing, and, for example, optics (including transmissive and/or reflective; diffractive and/or refractive elements) may be used to manipulate and direct the light beam passed through the micro-display element so that it impinges onto a semi-transparent screen behind, and parallel to, the mirror reflective element of the interior mirror assembly. This can greatly reduce the cost of providing a display in a rearview mirror assembly.

In a preferred embodiment, an image capture device (such as a CMOS camera) is positioned so as to obtain the image of the rearward scene of the vehicle (such as disclosed in commonly assigned U.S. Pat. No. 6,201,642 and U.S. pat. applications, Ser. No. 09/199,907, filed Nov. 25, 1998 by Bos et al. for WIDE ANGLE IMAGE CAPTURING SYSTEM FOR VEHICLE, now U.S. Pat. No. 6,717,610; and Ser. No. 10/010,862, filed Dec. 6, 2001 by Bos for PLASTIC LENS SYSTEM FOR VEHICLE IMAGING SYSTEM, now U.S. Pat. No. 6,757,109; and Ser. No. 09/767,939, filed Jan. 23, 2001 by Bos for WIDE ANGLE IMAGING SYSTEM, now U.S. Pat. No. 6,590,719, which are all hereby incorporated herein by reference). When the vehicle is put into reverse, information about the rear scene is sent to the micro-display. The micro-display image is illuminated from the back and, using folded optics, is magnified and projected in reverse onto a semi-transparent screen on the back of the transreflective element. Thus, a correct view of the rearward scene is displayed to the driver in the most natural place for the driver to have his attention focused when backing-up. When the vehicle is taken out of reverse, the micro-display is deactivated and the projected image disappears, leaving the driver with a normal view in the rearview mirror.

One aspect of the present invention is mounting a micro-display element in a plane different than the plane of the mirror reflective element and/or mounting a micro-display element at a position in or at the interior rearview mirror assembly at a location distal and remote from the location of the mirror reflective element (which, preferably, comprises a variable reflectance mirror element, such as an electrically dimmable mirror element, such as an electrochromic mirror element). An optical train is used to direct the light beam emanating from the micro-display element to a screen at the rear of the mirror reflective element and at a plane roughly perpendicular to the line of sight of the driver to the mirror reflective element.

Changes and modifications in the specifically described embodiments can be carried out without departing from the principles of the present invention, which is intended to be limited by the scope of the appended claims as interpreted according to the principles of patent law.

The embodiments of the invention in which an exclusive property or privilege is claimed are defined as follows:

1. A rearview mirror display system for a vehicle, said system comprising:
    a rearview mirror assembly, said rearview mirror assembly comprising a mirror casing;
    a reflective element included at said casing, said reflective element having a front and a back, said front being directed toward and viewable by a driver of the vehicle when said assembly is mounted in the vehicle;
    a projection display projecting a projection display image, said projection display positioned in said casing to the rear of said back of said reflective element, said projection display projecting said projection display image along an optic path to said back of said reflective element;
    a transmissive optic element positioned along said optic path, said transmissive optic element comprising one of a transmissive refractive optic element and a transmissive diffractive optic element, said projection display projecting said projection display image at least through said transmissive optic element and along said optic path to said back of said reflective element, the image at said back of said reflective element being an expanded image of said projection display image so as to provide an expanded image for viewing at said reflective element;
    a magnifying optic positioned along said optic path which functions to magnify said projection display image to expand the image to said expanded image at said back of said reflective element;
    said reflective element comprising a transflective reflective element; and
    wherein said expanded image is viewable by a driver of the vehicle from said front of said transflective reflective element.

2. The rearview mirror display system of claim 1, wherein a surface of said reflective element comprises a screen portion.

3. The rearview mirror display system of claim 2, wherein said screen portion comprises a semi-transparent screen portion.

4. The rearview mirror display system of claim 1, wherein said projection display comprises a micro-display element.

5. The rearview mirror display system of claim 4, wherein said micro-display element comprises a transmissive micro-display element.

6. The rearview mirror display system of claim 5, wherein said projection display comprises a light source which is operable to back light said transmissive micro-display element.

7. The rearview mirror display system of claim 6, wherein said light source comprises a light emitting diode.

8. The rearview mirror display system of claim 6, wherein said micro-display element comprises a reverse image display, said light source and said micro-display element projecting said reverse image display onto a screen portion of said reflective element, said reverse image display on said screen portion being a non-reverse image display when viewed from the opposite side of said reflective element.

9. The rearview mirror display system of claim 4, wherein said micro-display element is mounted on a printed circuit board within said easing.

10. The rearview mirror display system of claim 9, wherein said printed circuit board comprises circuitry associated with at least one accessory of said interior rearview minor assembly.

11. The rearview mirror display system of claim 10, wherein said micro-display element is aligned to project said projected light in a direction generally along said reflective element.

12. The rearview mirror display system of claim 11, wherein said projection display comprises a reflective optic.

13. The rearview mirror display system of claim 1, wherein said projection display is operable to display information received from a vision system of the vehicle, said vision system being operable to capture an image of a scene external of the vehicle.

14. The rearview mirror display system of claim 13, wherein said vision system comprises a rearview vision system, said rearview mirror assembly displaying a reversing scene in response to the vehicle being shifted into reverse.

15. The rearview mirror display system of claim 1, wherein said projection display comprises at least one reflective optic.

16. The rearview mirror display system of claim 1, wherein said reflective element comprises a prismatic reflective element.

17. The rearview mirror display system of claim 1, wherein said reflective clement comprises an electro-optic reflective element.

18. The rearview mirror display system of claim 17, wherein said electro-optic reflective element comprises an electrochromic reflective element.

* * * * *

UNITED STATES PATENT AND TRADEMARK OFFICE
CERTIFICATE OF CORRECTION

PATENT NO. : 7,046,448 B2  Page 1 of 1
APPLICATION NO. : 11/039901
DATED : May 16, 2006
INVENTOR(S) : Lori L. Burgner It is certified that error appears in the above-identified patent and that said Letters Patent is hereby corrected as shown below:

Column 1
Line 8, "Burnner" should be --Burgner--

Column 7
Line 64, "driver," should be --driver--

Column 9
Claim 9, Line 16, "easing" should be --casing--
Claim 10, Line 20, "minor" should be --mirror--

Column 10
Claim 17, Line 18, "clement" should be --element--

Signed and Sealed this

Sixth Day of January, 2009

JON W. DUDAS
*Director of the United States Patent and Trademark Office*